(12) United States Patent
Spahr et al.

(10) Patent No.: US 11,814,296 B2
(45) Date of Patent: Nov. 14, 2023

(54) CARBON-COATED SILICON OXIDE/GRAPHITE COMPOSITE PARTICLES, METHODS OF MAKING, AND APPLICATIONS OF THE SAME

(71) Applicant: Imerys Graphite & Carbon Switzerland Ltd., Bodio (CH)

(72) Inventors: Michael Spahr, Bellinzona (CH); Michal Gulas, Malvaglia (CH); Tatsuo Umeno, Kitakyushu (JP); Hiroyuki Taki, Tokyo (JP); Pascual Perez, Alboraya (ES)

(73) Assignee: Imerys Graphite & Carbon Switzerland Ltd., Bodio (CH)

( * ) Notice: Subject to any disclaimer, the term of this patent is extended or adjusted under 35 U.S.C. 154(b) by 853 days.

(21) Appl. No.: 16/631,696

(22) PCT Filed: Jul. 20, 2018

(86) PCT No.: PCT/EP2018/069832
§ 371 (c)(1),
(2) Date: Jan. 16, 2020

(87) PCT Pub. No.: WO2019/016395
PCT Pub. Date: Jan. 24, 2019

(65) Prior Publication Data
US 2020/0148545 A1     May 14, 2020

Related U.S. Application Data

(60) Provisional application No. 62/535,772, filed on Jul. 21, 2017.

(51) Int. Cl.
B32B 9/00     (2006.01)
C01B 33/18     (2006.01)
(Continued)

(52) U.S. Cl.
CPC ............ *C01B 33/18* (2013.01); *C01B 32/186* (2017.08); *C09C 3/063* (2013.01); *H01M 4/48* (2013.01);
(Continued)

(58) Field of Classification Search
CPC ....... Y10T 428/30; B82Y 30/00; B82Y 40/00; C01B 32/186; H01M 2004/027
(Continued)

(56) References Cited

U.S. PATENT DOCUMENTS 8,785,049 B2    7/2014   Kim
10,522,834 B2   12/2019   Yue

FOREIGN PATENT DOCUMENTS

CN     103 022 446 A    4/2013
CN     106 058 28 A     10/2016
(Continued)

OTHER PUBLICATIONS

International Search Report for International Application PCT/EP2018/069832, dated Oct. 19, 2018.

*Primary Examiner* — Daniel H Miller
(74) *Attorney, Agent, or Firm* — Finnegan, Henderson, Farabow, Garrett & Dunner, LLP (57) ABSTRACT

The present disclosure relates to novel particulate composite materials comprising a graphitic core particle associated with SiOx nanoparticles ($0.2 \leq X \leq 1.8$), and coated by a layer of non-graphitic carbon, e.g., pyrolytic carbon deposited by chemical vapor deposition (CVD). Also included are processes for making such particles as well as uses and downstream products for the novel composite material, in particular as an active material in negative electrodes in Li-ion batteries.

9 Claims, 3 Drawing Sheets

(51) Int. Cl.
    *C01B 32/186*    (2017.01)
    *C09C 3/06*       (2006.01)
    *H01M 4/48*      (2010.01)
    *H01M 10/0525*   (2010.01)
    *H01M 4/02*      (2006.01)
    *B82Y 30/00*     (2011.01)

(52) U.S. Cl.
    CPC ......... *H01M 10/0525* (2013.01); *B82Y 30/00* (2013.01); *C01P 2002/60* (2013.01); *C01P 2004/52* (2013.01); *C01P 2004/64* (2013.01); *C01P 2006/12* (2013.01); *H01M 2004/027* (2013.01); *Y10T 428/30* (2015.01)

(58) Field of Classification Search
    USPC ....................................................... 428/408
    See application file for complete search history.

(56) References Cited

FOREIGN PATENT DOCUMENTS

| | | |
|---|---|---|
| CN | 106 328 887 A | 1/2017 |
| CN | 106 848 264 A | 6/2017 |
| CN | 106 935 836 A | 7/2017 |
| EP | 2 450 986 A1 | 5/2012 |
| JP | 2008 210618 A | 9/2008 |
| JP | 2012-099452 A | 5/2012 |
| JP | 2017-526118 A | 9/2017 |

Fig. 3: SEM image of nano-SiO$_x$/graphite COMPOSITE A

Fig. 4: SEM image of CVD carbon coated nano-SiO$_x$/graphite COMPOSITE A2

Fig. 5: Viscosity of Active Electrode Materials comprising uncoated and CVD carbon-coated SiOX / Graphite Composite Material (Composite A)

CARBON-COATED SILICON OXIDE/GRAPHITE COMPOSITE PARTICLES, METHODS OF MAKING, AND APPLICATIONS OF THE SAME

CLAIM FOR PRIORITY

This application is a U.S. national phase entry of International Application No. PCT/EP2018/069832, filed Jul. 20, 2018, which claims the benefit of priority from U.S. Provisional Application No. 62/535,772, filed on Jul. 21, 2017, to both of which this application claims the benefit of priority, and the entirety of the subject matter of both of which is incorporated herein by reference.

FIELD OF THE DISCLOSURE

The present disclosure relates to novel particulate composite materials comprising a graphitic core particle associated with $SiO_X$ nanoparticles ($0.2 \leq X \leq 1.8$), and coated by a layer of non-graphitic carbon, e.g., pyrolytic carbon deposited by chemical vapor deposition (CVD). Also included are processes for making such particles as well as uses and downstream products for the novel composite material, in particular as an active material in negative electrodes in Li-ion batteries.

BACKGROUND

Silicon (Si), thanks to its theoretical capacity of 3578 mAh/g (based on $Li_{15}Si_4$ as fully lithiated phase) is one of the next-generation anode materials for lithium ion batteries (LIB). One of the main drawbacks when used in mobile energy applications relates to high volume changes during electrochemical lithiation and de-lithiation causing the cracking of silicon particles and a degradation of the silicon. This in turn leads to a limited cycling stability of silicon anodes. Another issue explaining the cycling limitation of the silicon negative electrodes is related to the reactivity of the silicon surface that leads to high first cycle charge losses and charge losses during subsequent cycling: Due to the volume expansion and cracking of the silicon particles during lithium insertion new reactive surfaces are created that react with the electrolyte, thereby consuming the electrolyte as well as lithium in the cell during cycling.

Nano-silicon is formed either by down-sizing silicon powder, chemical vapor deposition of gaseous silicon precursors, nano-silicon complexes occurring in silicon alloys or in-situ formation of silicon in a replacement reaction of lithium and silicon oxide forming silicon and lithium oxide in the cell. By controlling the concentration and electrolyte, the cycling stability may be improved but is still not good enough for using silicon-containing graphite electrodes in lithium-ion batteries used in applications that require extended cycling and durability like automotive and energy storage applications. At the same time, with the increasing energy density in lithium-ion batteries, controlling and maintaining safety is becoming more and more of an issue, as illustrated by some recent events involving explosions of lithium-ion batteries in electronic devices.

In view of the problems discussed above, it would seem that $SiO_x$, Si-metal alloys and nano-Si/carbon composites may be considered as alternative and possibly more proper candidates for high capacity anode materials. Another solution discussed in the art relates to decreasing the surface reactivity of silicon-based material (and graphite), depositing a passivation layer [Kim et al., Today, Volume 17, Number 6, July/August 2014; Chevrier et al. Journal of The Electrochemical Society, 161 (5) A783-A791 (2014); or JP 10012241 A]. This layer should be thick but flexible, and robust enough not to crack during the volume expansion of the silicon in the lithiation process but at the same time as thin as possible to not to sacrifice electrochemical capacity of the LIB cell and to limit the diffusion of lithium though the interface. The protective carbon layer helps to passivate the electrode surface versus the electrolyte and reduces the amount of passivating electrolyte additives like 1-fluoro ethylene carbonate.

Several technical solutions employing chemical vapor deposition (CVD) as one of the preparation steps of SiO/C composites have been described in the art. However, the composite material and processes for making it as described herein are believed to be unique compared to other Si/carbon composite materials described in the literature.

The inventors in CN106025220 report high reversible capacity and excellent cycle stability of a silicon oxide carbon composite using $SiO_x$ as a core with a carbon shell. The outer shell layer is produced by a CVD coating followed by ball milling with graphite. In WO 2015/186742, the authors propose that nano-sized (>100 nm) low crystalline carbon is mixed with $SiO_x$ and fibrous carbon and further exposed to chemical vapor deposition treatment to produce a carbon layer. Another disclosure is found in CN105226241 where nano-silicon, nano-carbon (graphene, carbon nanotubes and carbon fibers) and other carbon materials (natural graphite, synthetic graphite, mesophase carbon microbeads, soft carbon or hard carbon) are mixed and further coated by a silicon or carbon layer.

Materials for lithium ion batteries offering high specific capacity, processing and cycle performance are described in CN106025219, where again carbon nanotubes have been employed. In that patent application, $SiO_x$/graphite composites are sintered together with a carbon source followed by growth of carbon nanotubes by chemical vapor deposition. Liu et al. [Journal of Applied Electrochemistry (2009), 39(9), 1643-1649] prepared nano-SiO particles that are carbon coated in a fluidized bed CVD process. Such prepared particles are reported to exhibit smaller irreversible electrode expansion and enhanced cycling performance. Similarly, the inventors in CN106058228 found that a core-shell structure with a carbon based inner-core coated with silicon based nanoparticles show improved material properties after chemical vapor deposition coating. In a last example, CN106129372 discloses materials for a lithium ion battery comprising carbon materials modified with SiO particles exposed to a high temperature treatment.

Having regard to the above, it was on object of the present disclosure to provide advantageous carbon-coated nano-silicon oxide/graphite composite particulate materials that exhibit favorable electro-chemical properties.

SUMMARY

The present inventors have surprisingly found spherically-shaped natural flake graphite or synthetic graphite, e.g. from petroleum-based raw materials, as a core material in the preparation of carbon-coated nano-$SiO_x$/graphite composite materials yields composite particles exhibiting improved energy performance when used in lithium ion batteries, particularly compared to composite materials employing microcrystalline graphite, mesocarbon microbeads or a soft carbon or hard carbon as core particles described in the prior art.

Thus, in a first aspect of the present invention, a particulate composite material is provided comprising a graphitic core particle associated with $SiO_X$ nanoparticles, wherein X is between about 0.2 and about 1.8, or between about 0.3 and about 1.2, or between about 0.8 and about 1.2, coated by a layer of non-graphitic graphite (such as pyrolytic carbon).

In another, related aspect, the present invention provides a process for preparing a particulate composite material comprising a graphitic core particle associated with $SiO_X$ nanoparticles, wherein x is between about 0.2 and about 1.8, or between about 0.3 and about 1.2, or between about 0.8 and about 1.2, coated by a layer of non-graphitic carbon; comprising:

a) mixing graphitic carbon particles with $SiO_X$ nanoparticles;

b) coating the particles from step a) with a layer of non-graphitic carbon.

Another aspect of the present invention relates to a particulate composite material as described above, obtainable by the process outlined in the preceding paragraph.

Yet another aspect relates to a composition comprising the particulate composite material as described herein, wherein the composition optionally further comprises other materials such as synthetic or natural graphite.

In a fourth aspect, the present disclosure relates to a dispersion, comprising the particulate composite material as described hereinabove, or the composition of the present disclosure in a liquid, optionally wherein the liquid is water, an organic solvent, such as N-methyl-2-pyrrolidone (NMP), or mixtures thereof.

Given that the particulate composite material according to the present invention exhibits favorable electrochemical and processing properties, another aspect of the present disclosure includes the use of the particulate composite material, or the composition as described herein as an active material in the negative electrode of a lithium ion battery.

A negative electrode comprising the particulate composite material or the composition of the present invention as an active material represents yet another, related aspect of the present disclosure.

In another, related aspect, the present invention relates to a lithium ion battery comprising the negative electrode of the preceding paragraph. Finally, the present invention also provides an electric vehicle, an electric hybrid vehicle, or an energy storage cell comprising said lithium ion battery.

BRIEF DESCRIPTION OF THE DRAWINGS

Uncoated Composite A (diamond curve) shows high viscosity compared to a CVD-coated Composite A with a hydrophilic surface (squared curve) or a CVD-coated Composite A with hydrophobic surface (triangled curve).

DETAILED DESCRIPTION OF EXEMPLARY EMBODIMENTS OF THE INVENTION

The present inventors have found that spherically shaped natural flake graphite, flaky synthetic graphite or potato-shaped synthetic graphite (ideally having a particle size distribution with a $D_{90}$ of ≤60 μm) can be favorably used as a matrix (core) in the preparation of non-graphitic carbon coated nano-$SiO_X$/graphite composite materials. The so formed carbon-coated nano-$SiO_X$/graphite composite particles may improve energy performance of batteries, e.g., compared to composite materials using microcrystalline graphite, mesocarbon microbeads, hard carbon or soft carbon particles as the core, or compared to uncoated particles.

Thus, in a first aspect, the present invention relates to a particulate composite material comprising a graphitic core particle associated with $SiO_X$ nanoparticles (where X is between about 0.2 and about 1.8, or between about 0.3 and about 1.2, or between about 0.8 and about 1.2), and coated by a layer of non-graphitic carbon.

In some embodiments, the non-graphitic carbon layer of the composite material of the present invention is pyrolytic carbon, optionally wherein the pyrolytic carbon has been deposited by chemical vapor deposition (CVD). Suitable CVD techniques include thermal CVD, plasma-enhanced CVD, low pressure CVD, atmospheric pressure CVD, chemical vapor infiltration, laser assisted CVD, or hot filament CVD. The CVD coating may optionally be carried out with a carbon-containing gas or vapor such as toluene, benzene, isopropanol, methane, propane, butane, liquid propane gas, natural gas, acetylene, or mixtures thereof.

The $SiO_X$ nanoparticles of the composite material of the present invention are in some embodiments associated with the surface of the graphitic core particle. It is generally understood that the $SiO_X$ nanoparticles (having a high surface energy due to their small size) will typically be attached to the surface by physical adsorption to the surface of the graphitic core particles. However, other ways of associating to the surface of the graphitic particles are of course also contemplated in the context of the present disclosure.

In some embodiments, the graphitic core particle of the composite material of the present disclosure is chosen from either natural graphite or synthetic graphite. In some embodiments, the graphite may be flake natural graphite or flaky synthetic graphite. In other embodiments, the core particles are either spherically-shaped natural graphite or "potato-shaped" synthetic graphite. In some of these embodiments, the average aspect ratio between the shortest and longest axis of the spherically-shaped natural graphite core particles is between about 0.4 and 1.0, or between about 0.5 and 1.0, or between about 0.6 to 1.0. The average aspect ratio between the shortest and longest axis of the potato-shaped synthetic graphite core particles may be between about 0.1 and about 0.6, or between about 0.2 and about 0.5, or between about 0.2 and about 0.4, or between about 0.2 and 0.3.

The non-graphitic coating layer of the composite materials described herein can in some embodiments be characterized by a thickness of between about 5 to about 200 nm, or between about 10 and about 100 nm, or between about 10 and about 50 nm, or between about 20 and about 80 nm, or between about 40 and 80 nm, or between about 50 and 70 nm, or less than 100 nm, or less than 80 nm, or less than 50 nm;

In some embodiments, the composite material of the present invention can be characterized by a particle size distribution (PSD) with a $D_{50}$ of about 5 to about 50 µm, or about 7 to about 50 µm, or about 10 to about 50 µm, or about 10 to about 30 µm, or about 7 µm to about 25 µm, or about 10 to 20 µm. The composite material may in certain embodiments be characterized, alternatively or in addition, by a $D_{90}$ of less than about 60 µm, or less than about 50 µm, or less than about 40 µm, or less than about 30 µm, or from about 1 µm to about 40 µm, from about 5 µm to about 20 µm, from about 30 µm to about 40 µm, or from about 10 µm to about 30 µm, or between about 10 and about 30 µm.

Alternatively or in addition, the composite material of the present invention may in some embodiments be characterized by a BET specific surface area (SSA) of about 1 $m^2/g$ to about 15 $m^2/g$, or about 1 $m^2/g$ to about 10 $m^2/g$, or about 2 $m^2/g$ to about 8 $m^2/g$; or about 10 $m^2/g$ to about 50 $m^2/g$.

In certain embodiments, the composite material of the present invention can be further characterized, alternatively or in addition, by an elemental silicon content of about 1 to about 10 wt %, or about 1.2 to about 8 wt %, or about 1.5 to about 5 wt %, measured by Spark Discharge Optical Emission Spectroscopy (SDOES). In principle, it may also be possible to characterize the composite material by its $SiO_X$ material, but given that the oxygen content may vary it is preferred to define the material by its elemental silicon content.

In other embodiments, the composite material of the present invention can be further characterized by a crystallographic $L_c$ value of at least about 30 nm, or at least about 40 nm, or at least about 50 nm, or at least about 60 nm. Thus, the composite material is in these embodiments characterized by a highly crystalline graphitic core (the $SiO_X$ nanoparticles and the pyrolytic (typically amorphous) carbon coating do not have a major effect on the crystallographic $L_c$ value).

In yet other embodiments, the composite material of the present invention may be further characterized, alternatively or in addition, by a Raman $I_D/I_G$ ratio (R ($I_D/I_G$)) of larger than about 0.2, or larger than about 0.3, or between about 0.2 and 1.0, or between about 0.4 and 1.0, or between about 0.5 and 1.0 when measured with a laser having an excitation wavelength of 632.8 nm. The relatively high $I_D/I_G$ ratio reflects the presence of non-graphitic/amorphous carbon on the surface of the composite particles.

In certain embodiments, the composite material of the present disclosure may be further characterized, alternatively or in addition, by its electrochemical properties, when used as an active material in the negative electrode of a lithium ion battery. For example, in some embodiments, the composite material may be further characterized by an initial coulombic efficiency (ICE) of at least 75%, or at least 80%, of at least 85%, or at least 87%, or at least 88%, or at least 89%, or at least 90%. Alternatively or in addition, the composite material can be further characterized by a rate capability at 3C of at least about 65%, or at least about 70%, or at least about 75%, or at least about 80%, or at least about 85%, or at least about 87% when used as an active material in the negative electrode of a lithium ion battery.

Owing to the amorphous carbon layer attached by CVD to the surface of the composite particles, the coated the composite particles typically have a hydrophobic surface. However, in some alternative embodiments, the surface may be more hydrophilic, characterized by a good wettability, which may for example be expressed by a surface energy of at least 59 $mJ/m^2$, or at least 62, or at least 67, or at least 70 $mJ/m^2$, and/or by an oxygen content of greater than about 200 ppm, greater than about 400 ppm, greater than about 600 ppm, greater than about 700 ppm, or greater than about 800 ppm.

Such hydrophilic composite particles may be obtained by subjecting the coated particles to an oxidation treatment where the composite particles are contacted with an oxidant either in a gaseous/solid phase process with air, carbon dioxide, water vapor, oxygen, ozone, or any combination thereof, or, alternatively, in a liquid/solid phase process with aqueous hydrogen peroxide or other oxidants present in said liquid phase.

Further information about the characteristics of such hydrophilic particles and ways to prepare the hydrophilic coating are described in WO 2016/008951 (Imerys Graphite & Carbon Switzerland Ltd.), which is incorporated herein by reference in its entirety.

In any event, the conditions for the controlled oxidation should be chosen so as to avoid the oxidation of the $SiO_X$ particles to $SiO_2$ (which is no longer electrochemically active).

Methods for Producing Surface-Coated Silicon Oxide/Graphite Composite Particles

The present invention in another aspect also includes methods for producing silicon oxide/graphite composite particles surface-coated with non-graphitic carbon such as those described in the preceding section.

Thus, the present invention also relates to a process for preparing a particulate composite material comprising a graphitic core particle associated with $SiO_X$ nanoparticles, wherein X is between 0.2 and 1.8, or between 0.3 and 1.5, or between 0.8 and 1.2, coated by a layer of non-graphitic carbon; wherein the process comprises mixing graphitic carbon particles with $SiO_X$ nanoparticles (step (a)), followed by coating the particles from the mixing step with a layer of non-graphitic carbon (step (b)). The term "mixing" should in this context be understood in its broadest manner, i.e. it includes not only mixing of liquids or liquid dispersions, but also includes "dry mixing", which is sometimes also referred to as "blending".

In some embodiments of the present invention, the mixing step (a) includes mechanically mixing the graphitic carbon particles and the $SiO_X$ nanoparticles in a suitable mixer or blender. In other embodiments, step a) includes mixing the graphitic carbon particles and the $SiO_X$ nanoparticles in a so-called "hybridization system", e.g., in a Nara Hybridization System (NHS) from Nara Machinery Co. Ltd. A hybridization system may achieve better dispersion of particles because the particles are exposed to a high gas flow compared to mechanical blend systems. Typically, the above hybridization is carried out with dry materials, i.e. no solvent or dispersions are employed in this method (although the method may in principle also be carried out with dispersions).

Alternatively, step (a) may include preparing a liquid dispersion comprising the graphitic carbon particles and the $SiO_X$ nanoparticles, followed by drying the dispersion. The liquid is typically selected from water, organic solvents or mixtures thereof. When an organic solvent is used, this solvent should not be hazardous for the environment. Alcohols such as ethanol, isopropanol, or acetone or other non-toxic/non-hazardous organic solvents are preferred.

The preparation of the liquid dispersion may be carried out in a suitable mill, for example a bead mill or a planetary mill. Another possibility would entail preparing a slurry followed by a drying step to remove the solvent/liquid.

In certain embodiments, the drying step is favorably carried out by spray drying, which may optionally be carried out in a spray dryer, or in a spouted bed or fluidized bed reactor. Spray drying was found to be particularly suitable for obtaining composite particles characterized by homogenous distribution of $SiO_X$ nanoparticles on the graphite core particles.

The nano-$SiO_X$/graphite composite particles prepared as described above may then be subjected to non-graphitic carbon coating. In some embodiments, said coating is accomplished by chemical vapor deposition (CVD) of pyrolytic carbon. Such a deposited layer of pyrolytic carbon passivates the surface and also decreases the BET SSA by about 30% to 90%.

The layer of amorphous carbon should in general be thick enough to homogenously cover the composite but at the same time below a thickness which would cause cracking upon pressing which would lead to exposing more reactive surfaces to the electrolyte. The CVD method is particularly suitable for achieving this goal, since CVD yields a very homogenous coating, and furthermore, does not contain polycyclic aromatic hydrocarbons (which are typically the result of pitch coating).

In some of these embodiments, the coating is accomplished by thermal CVD, although other CVD variants such as plasma-enhanced CVD, low pressure CVD, atmospheric pressure CVD, chemical vapor infiltration, laser assisted CVD, or hot filament CVD may alternatively be used for the coating step. The CVD coating is typically carried out with a carbon-containing gas or vapor, such as toluene, benzene, isopropanol, methane, propane, butane, liquid propane gas, natural gas, acetylene, or mixtures thereof.

One advantage of using a CVD process as a preparation method for a carbon passivation layer lies in its good process control, e.g. as regards the possibility of controlling the thickness of the deposited layer and its homogenous structure. Three basic nanotexture types can be obtained by different CVD process conditions. These may vary in density, coherence lengths along the graphene planes and isotropicity. Compared to pitch coating, CVD is environmentally friendly and does not involve toxic precursors. Moreover, CVD with gas precursors or organic compound vapor forms thinner layers and fills smaller pores with pyrolytic carbon, i.e. certain pores can be accessed by gaseous precursors, but not by liquid pitch.

The CVD coating may be suitably carried out in a fluidized bed reactor, a rotary furnace, a tumbling bed reactor, or a fixed bed reactor, optionally wherein the temperature during the CVD coating is kept between 600° C. and 1200° C., or between 800° C. and 1100° C. The CVD process is typically carried out at or near atmospheric pressure.

Once the coated material is discharged from the reactor, it should ideally be allowed to cool down, subjected to control sieved and optionally also purified, e.g. by using magnetic removal of impurities as is known to those of skill in the art.

The amount of the deposited layer can be well-controlled when using a CVD process using one or more parameters like temperature, treatment time, carbon yield and amount of material to be treated. In some cases, the layer of non-graphitic (amorphous) carbon may be between 1 and 40 wt %, or between 2 and 20 wt %. Alternatively or in addition, the thickness of the non-graphitic continuous coating layer obtained in step b) may be between about 5 and about 200 nm, or between about 10 and about 100 nm, or between about 10 and about 50 nm, or between about 20 and about 80 nm, or between about 40 and 80 nm, or between about 50 and 70 nm, or less than 100 nm, or less than 80 nm, or less than 50 nm.

To illustrate the above, an example is provided. In one embodiment, 10 kg of the above mentioned nano-$SiO_X$/graphite (5%:95% w/w)) composite material obtained from step a) was loaded into a high temperature fluidized bed reactor and heated to 900° C. with constant flow of nitrogen or another inert gas. Once the desired temperature was reached, carbon containing gas or vapors were used as the carbon source. Such a carbon source can be for example toluene, benzene, isopropanol, methane, propane, butane, liquid propane gas, natural gas, acetylene, etc.

In case of toluene vapors, to reach around 4% weight coating corresponding to 30-70 nm uniform thickness of the coating layer, around 600 g of toluene during a total time of 120 min was delivered into the reactor.

When the coating step is carried out in a rotary furnace, it was found that to obtain similar deposition properties, a temperature of 1000° C. with a continuous feeding of 2 kg/h of the composite material and 3 L/min of propane were required.

The graphitic carbon particles used as a starting material in the process are typically selected from natural graphite and synthetic graphite, which may be either spherically-shaped natural graphite, potatoshaped synthetic graphite or even flake (natural or synthetic) graphite. Synthetic graphites are typically made from petroleum-based raw materials.

In certain embodiments, the graphitic carbon particles used as a starting material may be characterized by an average aspect ratio (ratio between the shortest and longest axis) of between about 0.4 and about 1.0 in case of spherically-shaped natural graphite core particles. Alternatively, the average aspect ratio for synthetic graphite may in some instances be between about 0.1 and about 0.6, or between about 0.2 and about 0.5, or between about 0.2 and about 0.4, or between about 0.2 and 0.3.

In many instances, the graphite particles are characterized by a particle size distribution (PSD) with a $D_{50}$ about 5 to about 50 μm, or about 7 to about 50 μm, of about 10 to about 50 μm, or about 10 to about 30 μm, or about 10 μm and about 20 nm. Alternatively or in addition, the graphite particles may be characterized by a $D_{90}$ of less than about 50 μm, or less than about 40 nm, or less than about 30 nm, or between about 10 to about 30 μm.

Alternatively or in addition, the graphite particles may be characterized by a BET SSA of about 1 m²/g to about 40 m²/g, or about 3 m²/g to about 20 m²/g, or about 4 m²/g to about 20 m²/g; or about 5 m²/g to about 10 m²/g.

In order to ensure excellent electrochemical properties of the composite material, the graphite particles should ideally have a high crystallinity. Thus, in certain embodiments, the graphite particles used as a starting material in the process may also be characterized by a crystallographic $L_c$ value of at least about 30 nm, or at least about 40 nm, or at least about 50 nm, or at least about 60 nm.

Suitable $SiO_X$ nanoparticles are available commercially, for example from US Research Nanomaterials Inc. (USA). The nanoparticles are typically characterized by a particle size distribution (PSD) with a $D_{50}$ of about 10 to about 1000 nm, or about 10 to about 300 nm, or about 15 nm to about 100 nm. Alternatively or in addition, they may be characterized by a $D_{90}$ of less than about 1000 nm, or less than about 500 nm, or less than about 300 nm, or less than about 200 nm.

In some embodiments, the $SiO_X$ nanoparticles are further characterized by a BET SSA of about 50 m²/g to about 500 m²/g, or about 80 m²/g to about 400 m²/g, or about 100 m²/g to about 300 m²/g, or about 150 m²/g to about 250 m²/g.

The weight ratio between the graphitic carbon particles and the $SiO_X$ nanoparticles employed in step a) of the process may in some embodiments be between 99:1 and 85:15, or between 98:2 and 90:10, or between 98:2 and 92:8.

In some embodiments, the ratio of the average particle size (expressed as $D_{50}$) between the graphitic carbon particles and the $SiO_X$ nanoparticles is between 5000:1 and 5:1, or between 3000:1 and 10:1, or between 1000:1 and 30:1, or between 200:1 and 40:1, or between 100:1 and 5:1.

Process step a) may in some instances entail the preparation of a liquid pre-dispersion of the $SiO_X$ nanoparticles in a suitable solvent (such as water), and the preparation of a liquid pre-dispersion of the graphitic carbon particles, followed by combining the two pre-dispersions to prepare the liquid dispersion. Since nanoparticles, including $SiO_X$ nanoparticles tend to agglomerate due to their high surface energy, it may in some cases be useful to subject the nano-$SiO_X$ pre-dispersion to a deagglomeration step, which may suitably be carried out in a ball mill, as illustrated below in more detail in the working examples (see also FIGS. 1 and 2, respectively).

In some embodiments, a dispersant may be added in step a) to prevent the aggregation of the $SiO_X$ nanoparticles. Suitable dispersants include but are not limited to non-ionic dispersants, for example selected from the group consisting of secondary alcohols, ethoxylates, alkyl polyglycol ethers, block co-polymers, polyethylene, polypropylene, polybutylene and mixtures thereof. Alternatively, the dispersant may also be an anionic dispersant, selected from the group consisting of calcium or ammonium lignosulfonate, and mixtures thereof.

In other embodiments, a binder may also be added in step a). Said binder is typically selected from the group consisting of a lignin-based polymer, a polystyrene or derivative thereof, a styrene-butadiene copolymer, melted phenol resin, polyvinylalcohol, polyfurfuryl alcohol, furfural, polyurethane, polystyreneacrylate, polyacrylate, polymethylmethacrylate, polymethacrylonitrile, polyoxymethylene, poly(methyl atropate), polyisobutene, polyethyleneoxide, polypropyleneoxide, polyethylene, polypropylene, polymethylacrylate, polybutadiene, polyisoprene, polyacrylonitrile, polyaniline, tannic acid, starch, gum arabic, maltodextrin, formaldehyde phenol resins, formaldehyde tetrahydrofuran resins, nitrile butyl rubber, sucrose, glucose, or other sugars, polyethyl ether ketone, polyphenylene sulfide, polyvinyl chloride, carboxymethylcellulose, methyl cellulose, gelatins, polyvinyl pyrrolidone, polylactic acid, latexes, and mixtures thereof.

In these embodiments, the binder may be added to the mixture before the (spray) drying step, or it may be added to either the $SiO_X$ or the graphite pre-dispersion before they are combined.

The process may in some embodiments include a further step c) wherein the coated composite particles obtained from step b) are subjected to a controlled oxidation treatment. More specifically, the optional step c) includes exposing the composite particles to an oxidant either in a gaseous/solid phase process with air, carbon dioxide, water vapor, oxygen, ozone, or any combination thereof, or, alternatively, in a liquid/solid phase process with aqueous hydrogen peroxide or other oxidants present in said liquid phase. Further details about this step are available from WO 2016/008951 (Imerys Graphite & Carbon Switzerland Ltd.), which is incorporated herein by reference.

The combined use of a carbon coating process followed by an oxidation treatment allows to produce composite particles having low BET SSA values, while simultaneously achieving the target of obtaining a surface functionalized with hydrophilic, oxygen-containing groups and an advantageous surface morphology. As a result, the particulate composite material with a hydrophilic carbon coating exhibits excellent properties and performance characteristics in lithium ion battery anodes.

Having now described a process for obtaining the novel carbon-coated $SiO_X$/graphite composite materials, it is clear that the present disclosure also includes particulate composite materials as defined herein which are obtainable by a process as described herein above.

Novel Particulate $SiO_X$/Graphite Composite Material Compositions and Dispersions Compositions comprising the particulate carbon-coated $SiO_X$/graphite composite material as described herein represent another aspect of the present disclosure. In some embodiments, the composition may further comprise other materials, such as (unmodified or modified) synthetic graphite, natural graphite, and/or graphitized mesocarbon beads. Said composition may also include several types of the carbon-coated $SiO_X$/graphite composite material as described herein.

In yet another aspect, the present disclosure relates to dispersions comprising the particulate carbon-coated $SiO_X$/graphite composite material, or the above compositions comprising said composite material in a liquid. The liquid for the dispersions may be water, or an organic solvent, such as N-methyl-2-pyrrolidone (NMP), or mixtures thereof.

These dispersions can for example be used as a base for conductive coatings or as a base for preparing electrodes for lithium ion batteries.

Electrodes and Batteries Comprising the Novel Particulate Composite Material

Another aspect of the present invention includes the use of the particulate carbon-coated $SiO_X$/graphite composite material, or the composition comprising said composite material as described herein as an active material in the negative electrode of a lithium ion battery.

In another, related aspect, the present disclosure relates to a negative electrode (anode) comprising the particulate carbon-coated $SiO_X$/graphite composite material, or the composition comprising said composite material, as an active material. In certain embodiments, the negative electrode is adapted for use in a lithium ion battery.

Yet another aspect thus relates to a lithium ion battery comprising said negative electrode comprising the particulate carbon-coated $SiO_X$/graphite composite material as described herein. The main applications of such lithium ion batteries are in portable devices, electric vehicles, hybrid electric vehicle, or plug-in hybrid electric vehicles. Another application for lithium-ion batteries containing such materials in the negative electrode is the storage of energy in batteries for grid stabilization and ancillary services. Therefore an electric vehicle, an electric hybrid vehicle, or an energy storage cell comprising the above described lithium ion battery represents yet another aspect of the present invention.

Measurement Methods

The percentage (%) values specified herein are by weight, unless specified otherwise.

Particle Size Distribution by Laser Diffraction

The presence of particles within a coherent light beam causes diffraction. The dimensions of the diffraction pattern are correlated with the particle size. A parallel beam from a low-power laser lights up a cell which contains the sample suspended in water. The beam leaving the cell is focused by an optical system. The distribution of the light energy in the focal plane of the system is then analyzed. The electrical signals provided by the optical detectors are transformed into particle size distribution by means of a calculator. The method yields the proportion of the total volume of particles to a discrete number of size classes forming a volumetric particle size distribution (PSD). The particle size distribution is typically defined by the values D10, D50 and D90, wherein 10 percent (by volume) of the particle population has a size below the D10 value, 50 percent (by volume) of the particle population has a size below the D50 value and 90 percent (by volume) of the particle population has a size below the D90 value.

The Particle Size Distribution of the particles was measured using a Sympatec HELOS BR Laser diffraction instrument equipped with RODOS/L dry dispersion unit and VIBRI/L dosing system. A small sample was placed on the dosing system and transported using 3 bars of compressed air through the light beam. The particle size distribution was calculated and reported in pm for the three quantiles: 10%, 50% and 90%.

REFERENCES

ISO 13320-1
BET Specific Surface Area (BET SSA)

The method is based on the registration of the absorption isotherm of liquid nitrogen in the range $p/p0=0.04$-$0.26$, at 77 K. The nitrogen gas adsorption is performed on a Quantachrome Autosorb-1. Following the procedure proposed by Brunauer, Emmet and Teller (Adsorption of Gases in Multimolecular Layers, J. Am. Chem. Soc., 1938, 60, 309-319), the monolayer capacity can be determined. Based on the cross-sectional area of the nitrogen molecule, the monolayer capacity and the weight of sample, the specific surface can then be calculated. The isotherm measured in the pressure range $p/p0$ 0.01-1, at 77 K are measured and processed with DFT calculation in order to assess the pore size distribution, micro- and mesopore volume and area.

REFERENCES

Ravikovitch, P., Vishnyakov, A., Russo, R., Neimark, A., Langmuir 16 (2000) 2311-2320;
Jagiello, J., Thommes, M., Carbon 42 (2004) 1227-1232.
Spark Discharge Optical Emission Spectroscopy (SD OES)

This analysis was performed by an SDAR OES Simultaneous Emission Spectrometer (Optical emission spectrometer (OES) with spark discharge in argon: ARL Spectrometer 3460). Carbonaceous powder is, if necessary, ground to a maximum particle size of 80 µm by means of a vibrated mill, e.g. a NAEF mill with a wolfram carbide container. Following the (optional) milling, the sample is passed through a screen (e.g. 0.5 mm) in order to remove any agglomerates or particles that have not been milled to the fineness required. Subsequently, the powder is compacted into a pressed pellet, for example by means of a Herzog Press.
Preparation of a Pressed Pellet (Using the Herzog Press):

After having placed a clean cardboard paper at the bottom of the pressing tool, about 6 g of the sample to be analyzed was filled into the at least 20 mm diameter round pressing die; a second clean cardboard paper was carefully put on top of the sample. The upper cylinder was lowered and pressure was applied until the manometer indicates 20 tons. The pressure was applied for at least 30 seconds; the pressure was then released and the sample removed, still with both sided protected by the cardboard paper. The sample (now in the form of a pellet) was then ready for analysis.

Spectrometric Analysis

The sample was placed onto the excitation stand under argon atmosphere of the spectrometer. Subsequently the fully automatic analysis (software of the spectrometer manufacturer) was initiated. The analysis was repeated (the sample pellet is rotated each time) until a repeatable analysis result was obtained. The instrument was calibrated with an internal standard that has been analyzed by external accredited laboratories.

REFERENCE

K. Slickers, Automatic Emission Spectroscopy, Bruhl, Druck and Presshaus Giessen (D) (1992)
Ash Content Ash content is assessed by gravimetric loss. A low-walled ceramic crucible is ignited at 800° C. in a muffle furnace and cooled to room temperature in a desiccator. A sample of 10 g of dry powder (accuracy 0.1 mg) is placed in a low-walled ceramic crucible. The powder is combusted at a temperature of 815° C. (at least 8 h) until at a constant weight. The residue corresponds to the ash content and is reported as a percentage of the initial weight of the sample.

REFERENCES

ISO 1171 Solid mineral fuels—Determination of ash
ISO 6245 Petroleum products—Determination of ash
ISO 8005 Carbonaceous materials used in the production of aluminium—Green and calcined coke—Determination of ash content
DIN 51903 Prüfung von Kohlenstoffmaterialien—Bestimmung des Aschewertes—Feststoffe
ASTM C561 Standard Test Method for Ash in a Graphite Sample
Ratio $I_D/I_G$ ($R(I_D/I_G)$)

The ratio $I_D/I_G$ ($R(I_D/I_G)$) is calculated from Raman measurements with a laser having a wavelength of 632.8 nm. $I_G$ and $I_D$ are the intensities of the G- and D-band Raman absorption peaks at 1580 $cm^{-1}$ and 1320 $cm^{-1}$, respectively. Raman analyses were performed using a LabRAM-ARA-MIS Micro-Raman Spectrometer from HORIBA Scientific with a 632.8 nm HeNe LASER.
Crystallite Size $L_c$ Crystallite size $L_c$ is determined by analysis of the (002) and (004) X-ray diffraction profiles. For the present invention, the method suggested by Iwashita (N. Iwashita, C. Rae Park, H. Fujimoto, M. Shiraishi and M. Inagaki, Carbon 42, 701-714 (2004)) is used. The algorithm proposed by Iwashita has been specifically developed for carbon materials. The widths of the line profiles at the half maximum of sample and reference are measured. By means of a correction function, the width of pure diffraction profile can be determined. The crystallite size is subsequently calculated by applying Scherrer's equation (P. Scherrer, Göttinger-Nachrichten 2 (1918) p. 98).
Scanning Electron Microscopy (SEM)

The particle surface of the carbonaceous material was imaged using a scanning electron microscope (Zeiss Leo 1530 SEM) equipped with a stub specimen holder, where the carbonaceous material is fixed by means of conductive stickers. An incident electron beam is focused under vacuum ($10^{-3}$ Pa) on the specimen and gives place to secondary-electron emission, together with backscattered electrons and emitted X-rays. The secondary-electron signals revealed by a detector permits the topographical mapping of the specimen surface with a maximum magnification of the order of 100 kx and a maximum resolution of the order of 1 nm.

Wettability/Surface Energy Measurement

At 20° C., with a spatula 1 cm³ of graphite or graphite composite powder are spread on a microscope slide and pressed with a pressure of 1 bar in order to prepare a surface as flat as possible. Aqueous solutions with 2.7% weight % of 2-propanol were prepared with distilled, deionized water. The surface tension of such a solution is 59 mN m⁻¹ or 59 mJ/m² (extrapolated from Vazquez et al., *J. Chem. Eng. Data,* 1995, 40, 611-614). Afterwards, a drop of this solution with total volume of 10 µL is dropped on the powder surface using Easy Drop (Kruss GmbH, Hamburg, Germany).

Using Drop Shape Analyses DSA1 software (Kruss GmbH, Hamburg, Germany) employing Tangent Method 1 with system water (Strom et al., *J. Colloid Interface Sci.,* 1987, 119, 352), the contact angle between the solution droplet and the powder is determined. A material is considered to be hydrophilic when the contact angle in this test is below 90°. If the contact angle is above 90°, the material is considered to be hydrophobic.

Electrochemical Analyses

Electrode Preparation:

The ingredients of the electrodes, active material, CMC solution (2.5 wt % aqueous solution) and SBR dispersion (48.5 wt % aqueous dispersion) were mixed with a rotation-revolution mixer (THINKY, ARE-310) for 10 minutes at 2000 rpm, using a weight ratio a shown in Table 1. The slurries were coated on a copper foil (t=18 µm) with 6 mg/cm² of loading and dried at 80° C. for 10 minutes. Afterwards high temperature vacuum drying was applied to the coated electrode at 120° C. for 6 hours. The electrodes so prepared were then pressed to obtain a density of 1.3 g/cm³.

TABLE 1

| Active Material | CMC (DKS, WS-C) | SBR (JSR, TRD102A) |
|---|---|---|
| COMPOSITE A, 94.5% | 4 | 1.5 |
| CVD (pyrolytic carbon) coated COMPOSITE A, 94.5% | 4 | 1.5 |
| CVD (pyrolytic carbon) coated COMPOSITE A2, 94.5% | 4 | 1.5 |
| GRAPHITE A, 97% | 1.5 | 1.5 |

Cell Preparation:

The electrochemical measurements were performed in a 2032 coin cell at 25° C. The cells were assembled in a glove box filled with Ar, using a lithium electrode (14 cm Ø, thickness 0.1 mm), a glass fiber separator (16 cm Ø, thickness 0.8 mm), and 200 µL of electrolyte (1M LiPF6 in EC:EMC:FEC 18:71:11 w/w).

A protocol for the measurement is described in Table 2. Charge capacity was defined as discharge at $1^{st}$ cycle, discharge capacity was defined as charge capacity at $1^{st}$ cycle, and initial coulombic efficiency (ICE) was calculated using discharged capacity divided by charged capacity. 3 C rate capability was calculated by the gained capacity with constant current during 3 C discharge, divided by the gained capacity with CC and CV charge during the $2^{nd}$ cycle.

TABLE 2

| | Type | Mode | Voltage | Value Current | Limit Current | Repeat | Rest |
|---|---|---|---|---|---|---|---|
| 1 | Discharge | CC/CV | 5 mV | 0.16 mA/cm² | 0.04 mA/cm² | 1 | 10 min |
| | Charge | CC/CV | 1.5 V | 0.16 mA/cm² | 0.04 mA/cm² | | 10 min |
| 2 | Discharge | CC/CV | 5 mV | 0.4 mA/cm² | 0.04 mA/cm² | 3 | 10 min |
| | Charge | CC/CV | 1.5 V | 2.7 mA/cm² | 0.04 mA/cm² | | 10 min |
| 3 | Discharge | CC/CV | 5 mV | 0.4 mA/cm² | 0.04 mA/cm² | 3 | 10 min |
| | Charge | CC/CV | 1.5 V | 5.3 mA/cm² | 0.04 mA/cm² | | 10 min |
| 4 | Discharge | CC/CV | 5 mV | 0.4 mA/cm² | 0.04 mA/cm² | 3 | 10 min |
| | Charge | CC/CV | 1.5 V | 8.0 mA/cm² | 0.04 mA/cm² | | 10 min |
| 5 | Discharge | CC/CV | 5 mV | 0.4 mA/cm² | 0.04 mA/cm² | 50 | 10 min |
| | Charge | CC/CV | 1.5 V | 2.7 mA/cm² | 0.04 mA/cm² | | 10 min |

Having now described the various aspects of the present invention in general terms, it will be apparent to those of skill in the art that many modifications and slight variations are possible without departing from the spirit and scope of the present invention. Some embodiments will now be described by way of illustration, with reference to the following working examples.

EXAMPLES

Example 1

Preparation of Nano-SiO$_X$/Graphite Composite Materials

A first pre-dispersion (pre-dispersion No. 1) with a silicon oxide nano-powder (SiO$_X$ with 99.5% having a size of 15-20 nm) from US Research Nanomaterials Inc. was prepared in water with a Dispermill equipment at 1000 rpm (about 1h of mixing). The dispersion containing water and the SiO$_X$ nanoparticles could be prepared with a solid content range between 4 and 16%. In some examples further described below, the solid content was 9.5% and 15%, respectively.

This dispersion was then treated in a Bead mill MMP1-EX (FDCP) from Buhler in order to de-agglomerate the nanoparticles in the dispersion.

The parameters used for this process step are described in Table 3.

TABLE 3

| Flow rate dispersion | 42% | corresponding to 2.5 kg/min |
|---|---|---|
| Pearls size | 0.3-0.4 | mm |
| Filter | 0.15 | mm |
| Torque | 1000 | rpm |
| Cooling temperature | 20 | ° C. |
| Energy applied | 150 | KWh/t |
| Time treatment estimated | 10 | Minutes (for volume tested) |

Figure 1:
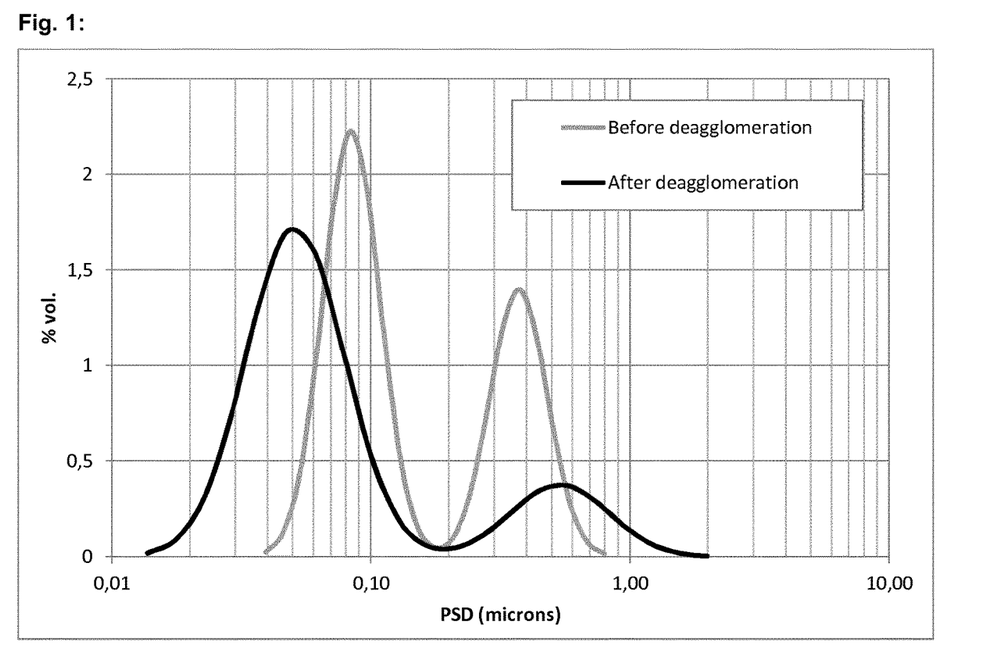
FIG. 1 shows the particle size distribution (PSD) of a pre-dispersion comprising $SiO_X$ nanoparticles before and after deagglomeration.

The dispersion weight and solid content were measured after this treatment. The process above permits to correctly disperse the SiO$_X$ nanoparticles into the water, as illustrated in FIG. 1.

A second water-based pre-dispersion (pre-dispersion No. 2) was prepared with graphite particles and, optionally, other additives such as ammonium lignosulfonate. Different compositions of the second dispersion were prepared to provide final compositions as shown in Table 4, each with a mixing time of 1 hour. Afterwards, both pre-dispersions were thoroughly mixed together, obtaining the final dispersion. For this step, a mixing time of 2 hours at 1000 rpm in a Dispermill was used. It is also possible to directly add the product of the second pre-dispersion into the first (nano-SiO$_X$) pre-dispersion after treatment in the Bead Mill as described above.

The composition of the final combined dispersion is shown in Table 4 below.

TABLE 4

| Final Composition of Dispersion | Recipe 1 | Recipe 2 | Recipe 3 |
| --- | --- | --- | --- |
| Nano-SiO$_x$ | 1.52% | 1.80% | 3.33% |
| Ammonium lignosulfonate | 0.00% | 0.43% | 0.00% |
| Graphite A | 15.15% | 14.43% | 16.67% |
| Water | 83.33% | 83.33% | 80.00% |
| Solid Content | 16.7% | 16.7% | 20.0% |
| Total | 100.0% | 100.0% | 100.0% |
| Ratio SiO$_x$/Graphite | 10.0% | 12.5% | 20.0% |
| Ratio Ammonium Lignosulfonate/Graphite | 0.0% | 3.0% | 0.0% |

Figure 2:
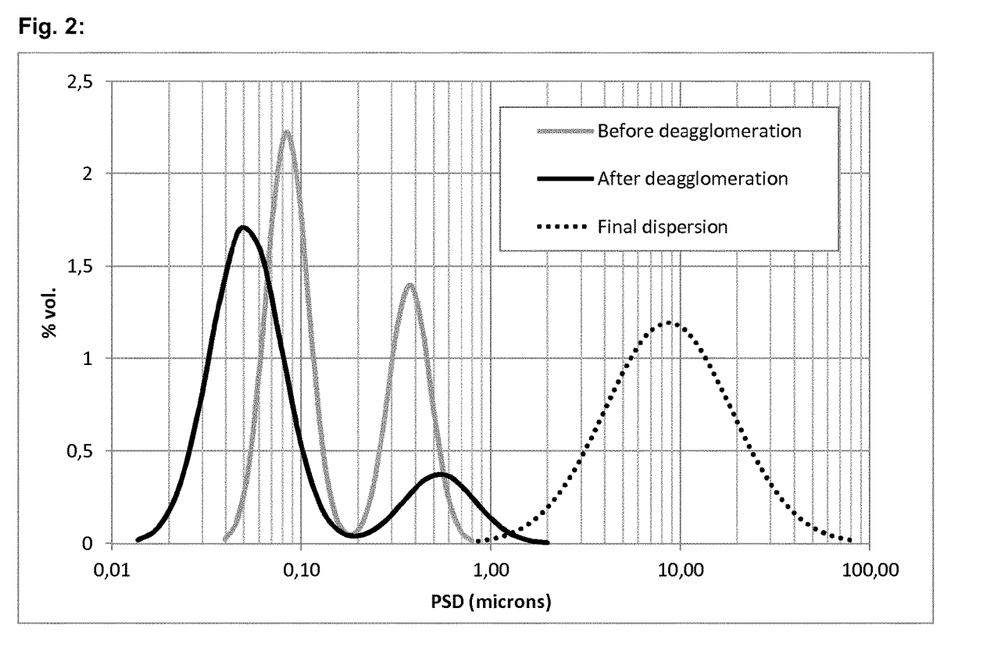
FIG. 2 illustrates the PSD of the pre-dispersion comprising $SiO_X$ nanoparticles before and after deagglomeration, as well as the PSD of the final dispersion comprising the graphitic core particles associated with the $SiO_X$ nanoparticles.

The final dispersions listed in Table 4 have an acidic pH (between 5 and 6.5) and low viscosity (between 3 and 30 mPa·s at 10 s$^{-1}$ shear rate). FIG. 2 shows the Particle Size Distribution obtained for the final dispersion.

Finally, these dispersions were spray-dried in a Mobile Minor™ spray dryer from GEA Niro Company in order to obtain a composite material comprising graphite particles onto which SiO$_X$ nano-particles are attached to their surface.

The standard conditions for the spray-drying process step are listed in Table 5.

TABLE 5

| | |
| --- | --- |
| Pressure of nozzle (bar) | 3 |
| T inlet (C. °) | 200 |
| T outlet (C. °) | 80 |
| Incoming gas flow (%) | 70 |
| Hammer (s) | 60 |
| Nozzle Type | 2-Fluid Nozzle |

In Table 6, detailed conditions reached during the spray-drying process are shown:

TABLE 6

| | |
| --- | --- |
| Pressure of nozzle (bar) | 3 |
| T inlet (C. °) | 200 |
| T outlet (C. °) | 80 |
| Incoming gas flow (%) | 70 |
| Hammer (s) | 60 |
| Nozzle Type | 2-Fluid nozzle |
| Pressure/back (mm.H2O) | 22 to 88 |
| Pump Speed (ml/min.) | 32 to 46 |
| Time Spray Drying (h) | 7 |
| Yield (%) | 92.17 |

The nano-SiO$_X$/graphite composites prepared according to the protocol above were then used as starting materials for the carbon CVD coating process, as described in more detail below.

Example 2

Preparation of a Carbon-Coated Nano-SiO$_X$/Graphite Composite ("COATED COMPOSITE A")

A first nano-SiO$_X$/graphite composite material ("COMPOSITE A") was prepared using "Recipe 1" from Table 4. Composite A, with a silicon content (based on total ash) of 2.8% by weight was loaded into a rotary furnace to perform a CVD coating using propane gas as the carbon source. The rotary furnace was heated to 1050° C. and afterwards the composite was continuously fed into the rotating kiln, still at a temperature of 1050° C. The mixture of propane gas as an amorphous carbon precursor (($C_3H_8$ at 3 L/min) and nitrogen gas ($N_2$ at 1 L/min) as carrier gas was fed into the reactor to maintain the pressure in the reactor at about 0-20 mbar above atmospheric pressure. The residence time of around 20 minutes was triggered by inclination of the rotary furnace, set to 4° and a rotation speed of 6 revolutions per minute. The CVD coated nano-SiO$_X$/graphite composite (carbon coated Composite A) was then either deactivated or activated in nitrogen or air atmosphere, respectively, depending on whether a hydrophobic or hydrophilic surface was desired. In case of using a fluidized bed reactor such post-treatment is not necessary as the reactor is typically operated in batch mode and purged with nitrogen or another inert gas before unloading the material from the reactor.

TABLE 7

| | Nano-SiO$_x$ | GRAPHITE A | COMPOSITE A | CVD coated COMPOSITE A |
| --- | --- | --- | --- | --- |
| BET SSA [m$^2$/g] | 170-200 | 7.4 | 14 | 4.3 |
| D$_{50}$ [μm] | 0.015-0.020 | 17 | 17 | — |
| Si content (SD OES) [%] | — | >0.0005 | 2 | 2 |
| Si content [%] (Total Ash content) | — | >0.01 | 2.8 | 2.2 |
| Initial coulombic efficiency (ICE) [%] | — | 92.6 | 89.2 | 90.3 |
| Rate capability at 3C [%] | — | 60 | 69 | 85 |

As shown in Table 7, a comparison of non-coated versus carbon-coated COMPOSITE A reveals that the initial coulombic efficiency and rate capability at 3 C is significantly improved for the CVD coated composite material. Notably, the specific surface area (BET SSA) decreased from 14 to 4.3 m²/g due to the carbon coating of the composite particles which acts as a thin carbon layer closing open pores on the particles and creating a protective layer for the nano-SiO$_X$ particles attached to the surface of the graphitic core particles.

Without wishing to be bound to any theory, it is believed that the (CVD) carbon coating binds the SiO$_X$ nanoparticles chemically onto the surface of the graphitic core particles, thereby ensuring a homogenous and stable distribution of the SiO$_X$ nanoparticles on the core particles. The chemical attachment of the SiOx at the graphite surface ensures that the particles stay electrically connected during the electrode operation accompanied by a significant dimensional change (breathing) of the particles because of the electrochemical lithium insertion and de-insertion. The coating also increases the electrical conductivity of the SiO$_x$ particles and improves particle/particle contact between the SiO$_x$ and the graphite core, as SiO$_X$ but also the Li$_2$O formed by the electrochemical reaction of the lithium with the SiOx during the first charging cycle of the lithium-ion cell are by themselves insulators. For electrodes comprising such carbon-coated SiO$_X$/graphite composite particles, the coating appears to improve the passivation of the electrode particles during the electrochemical lithium insertion. The improved passivation prevents the electrolyte from reacting at the electrode surface and therefore decreases the related charge losses and increases the coulombic efficiency of the electrochemical lithium insertion/de-insertion process.

Figure 3:
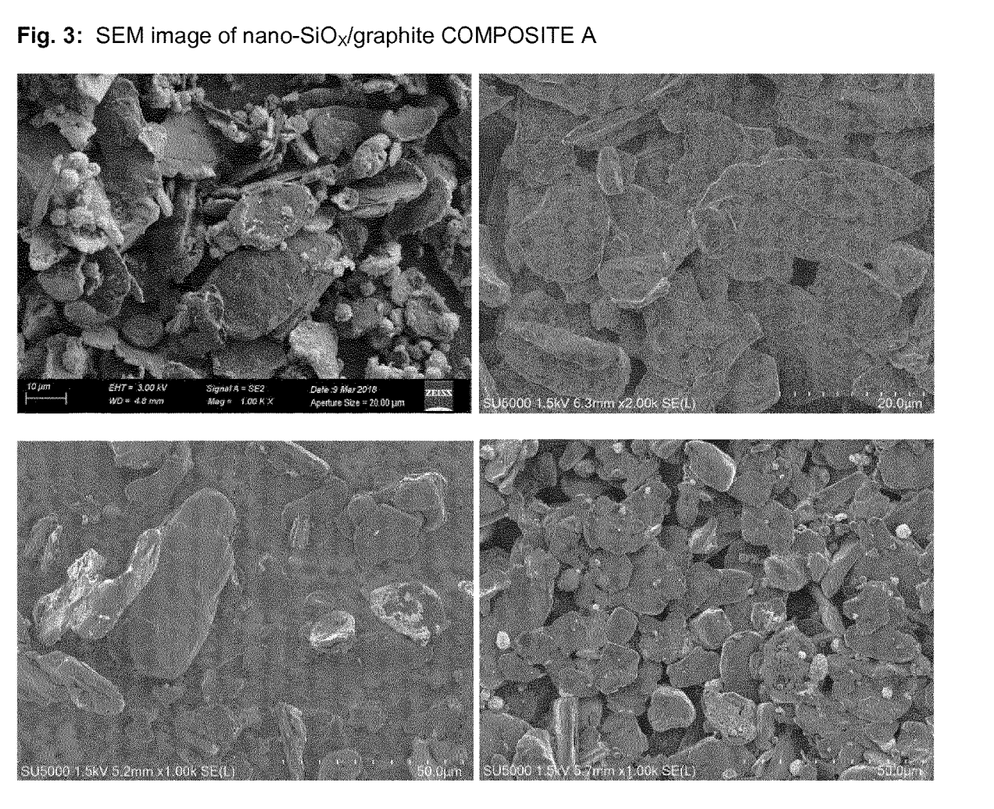
FIG. 3 shows different SEM images of nano-$SiO_X$/graphite Composite A: Top left: SEM image of non-carbon coated powder; top right: SEM image of electrode prepared with non-carbon coated composite as active material; bottom left: SEM image of carbon-coated Composite A powder; bottom right: SEM image of electrode with carbon-coated Composite A.
Figure 4:
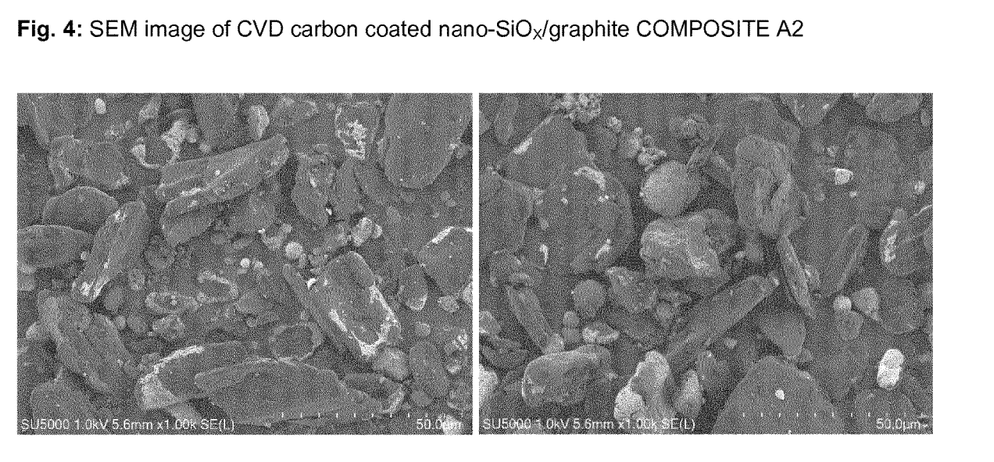
FIG. 4 shows an SEM image of a CVD carbon-coated nano-$SiO_X$/graphite Composite A2.

Another improvement was observed with respect to a slurry preparation in the context of preparing electrodes for lithium ion batteries. It was found that materials without a carbon coating were difficult to handle during electrode preparation. In particular, free SiO$_X$ nanoparticles were observed during the drying, resulting in a color gradation and a non-uniform electrode (see SEM pictures in FIG. 3, top right image).

Figure 5:
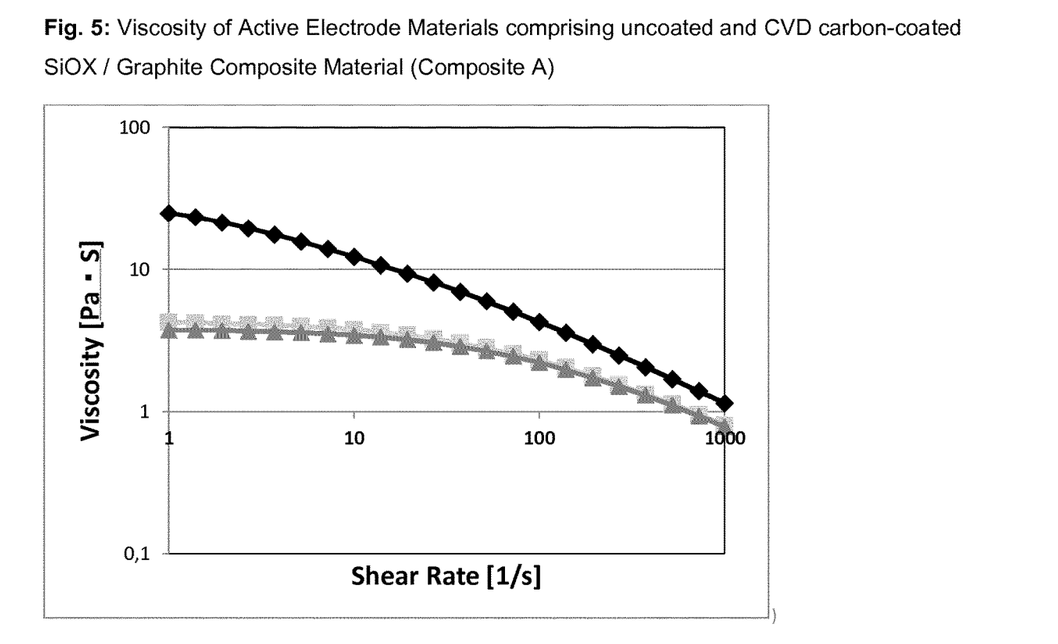
FIG. 5 illustrates the viscosity in dependence of the shear rate of an active electrode material comprising a variety of Composite A compositions (active material (Composite) to carboxymethyl cellulose binder (WS-C(CMC)) ratio of 97.5 to 2.5 with a solid content of 46%).

It was found that CVD carbon coating of nano-SiO$_X$/graphite composite particles also improves the processing of the material during the electrode preparation. The electrode preparation involved preparing a slurry containing the active material, which was then coated on a metal foil current collector in a wet coating process, followed by drying and roll-pressing to the required electrode density. During the coating process using nano-SiO$_X$/graphite composite particles without a carbon coating, a variety of obstacles were observed, such as agglomeration of undispersed carbon particles, thereby causing defects, sedimentation and binder segregation, which in turn created inhomogeneities on the electrode surface. Moreover, a rather high viscosity, especially at higher solid contents, was observed, causing difficulties during slurry preparation and mixing (cf. FIG. 5).

Example 3

Method for the Preparation of Nano-SiO$_X$/Graphite COMPOSITE A2

A nano-SiO$_X$/graphite composite ("COMPOSITE A2") was prepared using "Recipe 3" from Table 4. Composite A2, with Si content of about 6% (measured using the total ash method) was loaded into a rotary furnace to carry out a carbon CVD coating using propane gas. Conditions for the CVD coating were the same as in Example 2. A rotary furnace was heated to 1050° C. and the composite material was then continuously fed into the rotating kiln. The mixture of propane gas as an amorphous carbon precursor (C$_3$H$_8$ at 3 L/min) and nitrogen gas as carrier gas (N$_2$ at 1 L/min) was fed into the reactor to maintain the pressure in the reactor at 0-20 mbar above atmospheric pressure. The residence time of around 20 minutes was triggered by inclination of the rotary furnace, set to 4° and a rotation speed of 6 revolutions per minute.

TABLE 8

| | Nano-SiO$_x$ | GRAPHITE A | COMPOSITE A2 | CVD coated COMPOSITE A2 | CVD coated COMPOSITE A |
|---|---|---|---|---|---|
| BET SSA [m²/g] | 170-200 | 7.4 | 23.6 | 6.8 | 4.3 |
| D$_{50}$ [µm] | 0.015-0.020 | 17 | 17 | 17 | — |
| Si content [%] (SD OES) | — | >0.0005 | 4.1 | 4.1 | 2 |
| Si content [%] (Total ash content) | — | >0.01 | 5.9 | 6 | 2.2 |
| Initial coulombic efficiency (ICE) [%] | — | 92.6 | — | 87.7 | 90.3 |
| Rate capability at 3C [%] | — | 60 | — | 93 | 85 |

Material "Composite A2" exhibited a higher BET SSA compared to "Composite A" in view of its higher content of nano-SiO$_X$. CVD carbon coated Composite A2 material showed a further increase in the 3C rate capability compared to CVD carbon coated Composite A while the initial coulombic efficiency decreased slightly to about 88%.

The invention claimed is:

1. A particulate composite material comprising a nano-SiO$_X$/graphite composite particle comprising a graphitic core particle associated with SiOx nanoparticles, wherein X is between 0.2 and 1.8, and wherein the nano-SiO$_X$/ graphite composite particle is coated by a layer of non-graphitic carbon;
   wherein the non-graphitic carbon layer is pyrolytic carbon;
   wherein the SiOx nanoparticles are characterized by a particle size distribution (PSD) with a D$_{50}$ of 15 to 100 nm; and
   wherein the SiOx nanoparticles are associated with the surface of the graphitic core particle.

2. The composite material of claims 1, wherein the pyrolytic carbon is deposited by chemical vapor deposition (CVD).

3. The composite material of claim 1, wherein the graphitic core particle is either spherically-shaped natural graphite having an average aspect ratio between the shortest and longest axis of the spherically-shaped natural graphite core particles that is between about 0.4 and about 1.0, or synthetic graphite having an average aspect ratio that is between about 0.1 and about 0.6.

4. The composite material of claim 1, wherein the composite material is further characterized by any one or more of the following parameters:
   i) a thickness of the non-graphitic continuous coating layer of between about 5 to about 200 nm, or between about 10 and about;
   ii) a particle size distribution (PSD) with a $D_{50}$ of about 15 to about 50 μm;
   iii) a BET SSA of about 1 $m^2/g$ to about 15 $m^2/g$;
   iv) a crystallographic $L_c$ value of at least about 30 nm;
   v) a Raman $I_D/I_G$ ratio (R ($I_D/I_G$)) of larger than about 0.2 when measured with a laser having an excitation wavelength of 632.8 nm; and
   vi) a particle size distribution (PSD) with a $D_{90}$ of less than about 60 μm.

5. The composite material of claim 1, wherein the composite material is further characterized by any one or more of the following parameters:
   i) an initial coulombic efficiency of at least 75%, when used as an active material in the negative electrode of a lithium ion battery; and
   ii) a rate capability at 3C of at least 65%, when used as an active material in the negative electrode of a lithium ion battery.

6. A composition comprising the particulate composite material according to claim 1, wherein the composition further comprises natural graphite, synthetic graphite, and/or graphitized mesocarbon beads.

7. A dispersion comprising the particulate composite material according to claim 1 in a liquid, wherein the liquid is water, an organic solvent, or mixtures thereof.

8. A negative electrode comprising the particulate composite material according to claim 1 as an active material.

9. A lithium ion battery comprising the negative electrode according to claim 8.

* * * * *